(12) United States Patent
Kirby

(10) Patent No.: US 8,860,930 B2
(45) Date of Patent: Oct. 14, 2014

(54) THREE DIMENSIONAL SURFACE MAPPING SYSTEM USING OPTICAL FLOW

(76) Inventor: Richard Kirby, Heber City, UT (US)

( * ) Notice: Subject to any disclaimer, the term of this patent is extended or adjusted under 35 U.S.C. 154(b) by 260 days.

(21) Appl. No.: 13/487,180

(22) Filed: Jun. 2, 2012

(65) Prior Publication Data

US 2013/0321790 A1    Dec. 5, 2013

(51) Int. Cl.
*G01C 3/08*    (2006.01)

(52) U.S. Cl.
USPC ......... 356/3.14; 356/3.01; 356/3.1; 356/4.01; 356/4.1

(58) Field of Classification Search
CPC ......... G01C 3/08; G01S 17/89; G01S 17/936; H04N 9/045; H04N 13/0022; H04N 5/2355
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 6,323,942 B1 | 11/2001 | Bamji | |
| 6,515,740 B2 | 2/2003 | Bamji | |
| 6,580,496 B2 | 6/2003 | Bamji | |
| 8,134,637 B2 | 3/2012 | Rossbach | |
| 2006/0221250 A1* | 10/2006 | Rossbach et al. | 348/630 |

OTHER PUBLICATIONS

Horn, B. K., and Schunck, B. G., Determining Optical Flow,1980. Massachusetts Institute of Technology, Cambridge, MA, USA.
Slesareva, N., Bruhn, A., and Weickert, J., Optic Flow Goes Stereo: A Variational Method for Estimating Discontinuity-Preserving Dense Disparity Maps, 2005, DAFM 2005, LNCS 3663, pp. 33-40 2005, Saarbrucken, Germany.
Kim, J., Brambley, G., Dual Opti-flow Integrated Navigation for Small-scale Flying Robots, 2008 ACRA, Canberra, Australia.

* cited by examiner

*Primary Examiner* — Luke Ratcliffe

(57) ABSTRACT

A method and system for 3D surface mapping system using a plurality of image sensors, each image sensor associated with an optical flow processor, each image sensor sharing a substantially coaxial optical path from the scene to a beam splitter and having substantially non-coaxial optical paths between the beam splitter and the image sensor such that the optical magnification of each optical path varies differently with the distance between the system and the surface of interest. The ratio of detected optical flows combined with the parameters of the two optical paths and the baseline between the image sensors is used to compute the Z-distance from the optical center of the image sensors to the surface.

20 Claims, 11 Drawing Sheets

THREE DIMENSIONAL SURFACE MAPPING SYSTEM USING OPTICAL FLOW

CROSS-REFERENCE TO RELATED APPLICATIONS

Not applicable.

FEDERALLY SPONSORED RESEARCH

Not applicable.

SEQUENCE LISTING OR PROGRAM

Not applicable.

BACKGROUND OF THE INVENTION

1. Field of Invention

This invention relates to three dimensional (3D) surfacing mapping systems, specifically to systems that use a plurality of image sensors and optical flow to calculate Z-distances.

2. Prior Art

Reconstructing the 3D coordinates of points on surfaces in a scene from one or more two-dimensional (2D) images is one of the main topics of computer vision. The uses of such systems include navigation, mapping, gaming, motion analysis, medical imaging, and 3D photography.

In stereoscopic image processing, a pair of 2D images of the scene is taken by right and left cameras (stereo camera pair) from different positions, and correspondences (2D point pairs—one from each image that represent the same location in the 3D scene) between the images are found. Using the correspondences, the Z-distance (the distance between the optical center of one of the stereo cameras and the target) is found from the parallax according to the principle of triangulation using epipolar geometry.

Correspondences can be manually selected or automatically selected using one of several algorithms like corner detectors, normalized cross correlation, or dynamic programming. Finding accurate correspondences automatically is a difficult problem and has yet to be completely solved. This is due to a multitude of problems which include 1) occlusions—where one of the stereo cameras can see a point that is hidden from the other camera, 2) order swapping—in certain geometries, points in the 3D scene do not follow the same progression when projected onto a 2D image, 3) repetitive patterns in an image that allow multiple solutions to the correspondence finding problem, only one of which is correct, 4) shadows which change with viewing angle and lighting conditions, 5) reflections which change with viewing angle and lighting conditions, 6) focus which can change with viewing angle, and 7) coloration which can change with changing viewing angles and lighting conditions. The result of not being able to accurately determine correspondences is that the Z-distances cannot be determined with accuracy.

Optical flow is a technique originally developed by Horn and Schunck (Horn, B. K., and Schunck, B. G. (1980). *Determining Optical Flow*. Massachusetts Institute of Technology) that detects the "apparent velocities of movement of brightness patterns in an image." The movement of brightness patterns can be used to infer motion in the 3O scene. However, absolute distances in the 3D scene cannot be determined without knowledge of the Z-distances and optical flow does not determine Z-distance.

Using optical flow as an added constraint to find correspondences between stereo images was presented by Slesareva, Bruhn, and Weickert (Slesareva, N., Bruhn, A., and Weickert, J. (2005). *Optic Flow Goes Stereo: A Variational Method for Estimating Discontinuity—Preserving Dense Disparity Maps*. DAFM 2005, LNCS 3663, pp. 33-40 2005.). Slesareva et al proposed a method of estimating depth by integrating the epipolar constraint in the optic flow method. This extra constraint reportedly improves the correspondence finding, but does not completely resolve the issues of finding the correspondences between two images that were acquired from different viewing angles because of the issues mentioned above.

Kim and Brambley (Kim, J., Brambley, G. (2008). *Dual Opti-flow Integrated Navigation for Small-scale Flying Robots*. ACRA 2008.) used a stereo pair of optical flow sensors to determine depth. However, finding correspondences between images that are taken at different viewing angles is as problematic for optical flow as it is for images for the same reasons described above. Additionally, Kim and Brambley's approach was incapable of detecting the difference between the distance between the camera and the surface and skewing between the image plane and that of the surface.

3D cameras using separate Z-distance range-finding systems are known in the art, for example: U.S. Pat. No. 6,323,942 entitled CMOS-Compatible Three-Dimensional Image Sensor IC, U.S. Pat. No. 6,515,740 entitled Methods for CMOS-Compatible Three-Dimensional Imaging Sensing Using Quantum Efficiency Modulation and U.S. Pat. No. 6,580,496 entitled Systems for CMOS-Compatible Three-Dimensional Imaging Sensing Using Quantum Efficiency Modulation. These patents disclose sensor systems that provide Z-distance data at each pixel location in the image sensor array for each frame of acquired data. Z-distance detectors according to the '942 patent determine Z-distance by measuring time-of-flight (TOF) between emission of pulsed optical energy and detection of target surface reflected optical energy. Z-distance systems according to the '740 and '496 patents operate somewhat similarly but detect phase shift between emitted and reflected-detected optical energy to determine Z-distance. Detection of reflected optical energy at multiple locations in the pixel array results in measurement signals that are referred to as dense depth maps. These systems have limited depth resolution due to the difficulty in timing the very short periods in which light travels and are subject to noise due to the reflection of the optical energy off nearby surfaces.

U.S. Pat. No. 8,134,637 discloses a depth camera which incorporates a beam splitter which breaks the incoming light into the visible light for image creation and the near infrared (NIR) light from an NIR light emitter. FIG. 1 shows the system of the '637 patent. This system emits NIR light from an emitter 105 modulated by modulator 125. The NIR light output 25 is focused on the target surface 40 via lens 115. The reflected NIR optical energy 30 enters lens 20' coaxial to the higher resolution Red-Green-Blue (RGB) light energy. The beam splitting structure 140 and hot mirror 150 separate the NIR light energy from the RGB light energy. The RGB light energy goes to one image sensor array 160 on first array substrate 170 and the NIR light goes to a second lower resolution image sensor 130 on second substrate 170'. RGB data is processed by the RGB processor unit 65. NIR data is processed by Z-distance processor 135. While reportedly being able to improve the X and Y resolution of the Z-distance data, the resolution of the Z-distance data itself still suffers from the difficulty in accurately detecting extremely short TOF durations (on the order of pico-seconds) and noise caused by the NIR light energy reflecting off nearby surfaces.

Objects and Advantages

Accordingly, several objects and advantages of the present invention are:
(1) to provide a system that measures the X, Y, and Z coordinates of points on surfaces in a 3D scene that eliminates the need to find point correspondences between stereo image pairs and the associated difficulties caused by changing pose and lighting conditions in stereoscopic photography.
(2) to provide a system that measures the X, Y, and Z coordinates of points on surfaces in the scene that doesn't depend on the accuracy of measuring very short TOF durations.
(3) to provide a system that measures the X, Y, and Z coordinates of points on surfaces in the scene that is resistant to errors associated with spurious reflected energy.
(4) to provide a system that measures the X, Y, and Z coordinates of points on surfaces in the scene that is not affected by skewing of the plane of the image sensor relative to the surface being imaged.
(5) to provide a system that measures the velocity of the image sensors relative to the surface being imaged.
(6) to provide a system that measures the velocity of one surface component relative to other surface components.

Further objects and advantages of this invention will become apparent from a consideration of the drawings and ensuing descriptions.

SUMMARY

According to one embodiment of the present invention, a 3D surface mapping system comprising a plurality of image sensors, each image sensor associated with an optical flow processor, each image sensor sharing a substantially coaxial optical path from the scene to a beam splitter and having substantially non-coaxial optical paths between the beam splitter and the image sensor such that the optical magnification of each optical path varies differently with the distance between the system and the surface of interest. The ratio of detected optical flows combined with the parameters of the two optical paths and the baseline between the image sensors is used to compute the Z-distance from the optical center of the image sensors to the surface. The Z-distance to the surface in the scene is used to compute the time varying X and Y components of points in the scene. The time varying X and Y components of points in the scene along with the time-varying Z-distance is used to calculate velocity in 3D. This method substantially overcomes the issues with the previously mentioned means of recovering 3D data from multiple 2D images because the coaxial portion of the optical path avoids the multitude of issues associated with finding correspondences in 2D stereo image pairs. Additionally, because the coaxial portion of the optical path eliminates parallax, there is no effect on Z-distance measurements due to skewing of the image plane and the plane of the surface. Furthermore, because neither TOF nor reflected electromagnetic radiation are being used to measure Z-distance, the problems with measuring short duration time periods and with reflected noise are overcome.

BRIEF DESCRIPTION OF THE DRAWINGS in the drawings, closely related figures have the same number but different alphabetic suffixes.

FIG. 1 is a prior art diagram of a distance measuring system using two image sensors and a beam splitter from U.S. Pat. No. 8,134,637.

DRAWINGS

Reference Numerals

Figure 1:
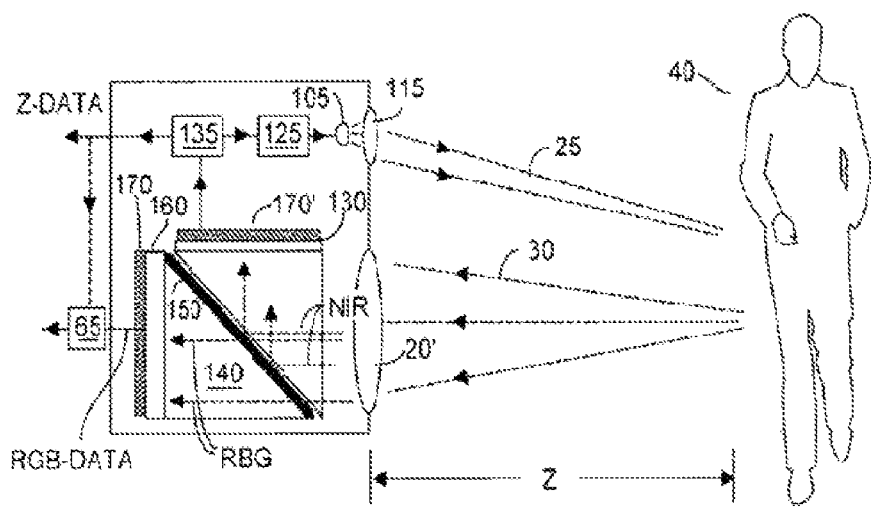

20' focus lens
25 NIR light output
30 reflected optical energy
40 target surface
65 RGB processor unit
105 optical emitter
115 NIR light energy lens
125 modulator unit
130 image sensor array of lower resolution pixel Z sensors
135 Z-distance processor
140 beam splitting structure
150 hot mirror surface
160 image sensor array of high resolution pixel sensors
170 first integrated circuit (IC) substrate
170' second IC substrate
205 image sensor
210 optical flow processor
215 first imaging lens
220 second imaging lens
225 X, Y, and Z processor
230 3D surface mapping system
235 image path steering assembly
240 surface in 3D scene
245 mirror
250 beam splitter
255 coaxial optical path
256 first independent optical path 257 second independent optical path
260 stationary surface in scene
265 image processor
270 processor or computer
275 memory
280 input/output devices
285 integrated optical flow sensor
286 optical path steering element
287 gimbaled mount
290 optical path steering device with encoder
295 initialization algorithms
300 image sensor control algorithms
305 optical flow algorithms
310 steering path device encoder data
315 dense Z-distance map algorithms
320 single point Z-distance algorithms
325 X and Y determination algorithms
330 save to memory algorithms
335 render and display algorithms
340 3D data streaming algorithms
345 completion decision block
355 non-integrated image sensor
360 non-integrated optical flow processor

DETAILED DESCRIPTION

FIGS. 2-4

Preferred Embodiment

Optical flow measures the velocity of brightness patterns in image coordinates. As such, some movement between successive images is requisite to generate velocity of brightness patterns. In many applications, this movement is inherent in the application. For example, when the 3D surface mapping system of this application is being used as a navigation system on a moving vehicle, than the requisite movement comes from the vehicle. In other applications, perceived motion must be induced by the 3D surface mapping system. The two applications (moving and stationary) are fundamentally the same once perceived motion is induced by the 3D surface mapping system. This description first illustrates the invention as it applies to both moving and stationary applications and then illustrates a preferred embodiment for inducing perceived motion in stationary systems.

Figure 2:
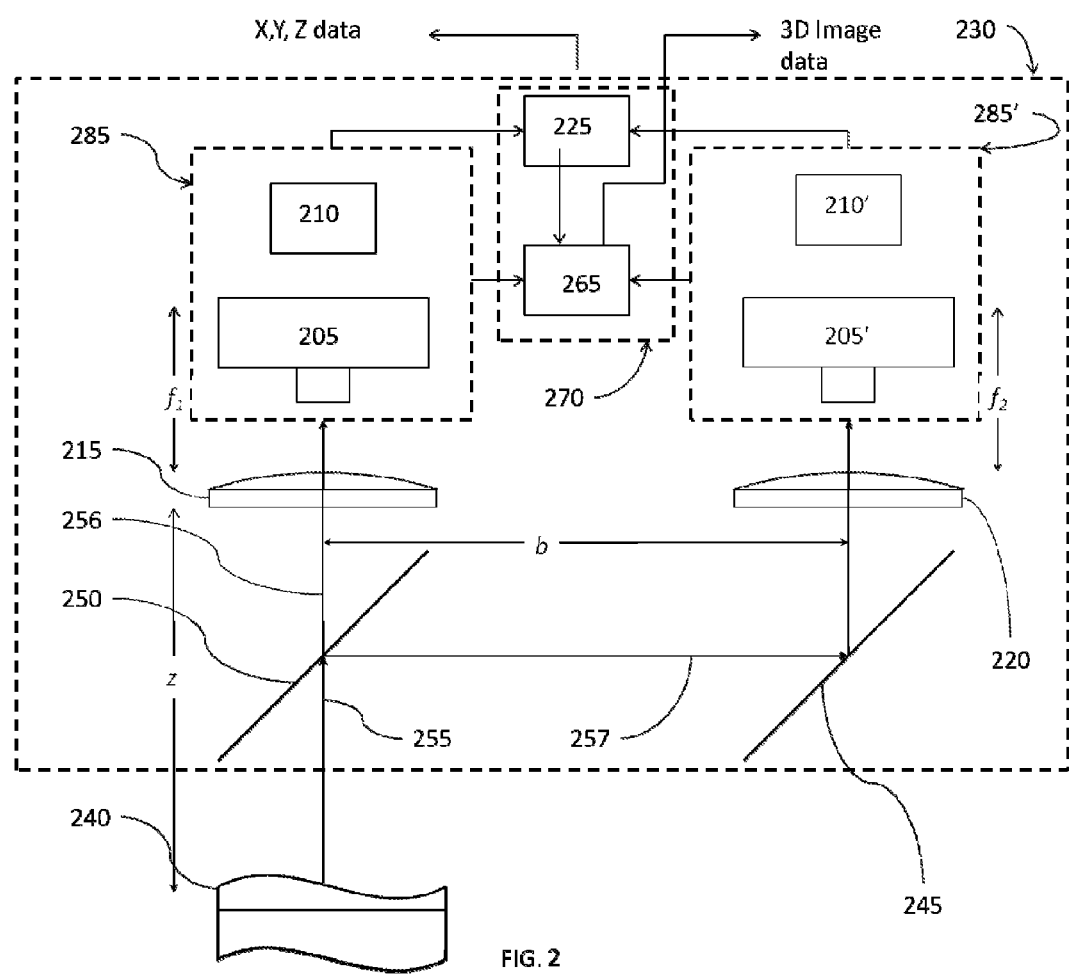
FIG. 2 is an illustration of one preferred embodiment of the 3D surface mapping system where the image planes of the image sensors are coplanar and integrated optical flow sensors are used.

FIG. 2 illustrates a preferred embodiment of the 3D surface mapping system according to the invention. A first integrated optical flow sensor 285 composed of an image sensor 205 and an optical flow processor 210, images a surface in the 3D scene 240 along coaxial optical path 255, through beam splitter 250, along first independent optical path 256 and imaging lens 215. The surface 240 being imaged may have a flat surface parallel to the image plane of image sensor 205, or it may have surface variations. Additionally, there may be several surfaces in the scene at various different distances from the image sensor 205 and moving at different velocities relative to each other. While one preferred embodiment uses an integrated optical flow sensor, in another preferred embodiment the image sensor 205 and optical flow processor 210 are discrete components. Additionally, the optical flow processor 210 may be a computer program implemented on a general purpose processor, in an Field Programmable Gate Array (FPGA), Application Specific Integrated Circuit (ASIC), discrete state engine, or similar device. One skilled in the art will be able to conceive of numerous ways of implementing a combination image sensor and optical flow processor.

The image sensor 205 may have a range of pixel counts and resolutions as well as frame rates. In one preferred embodiment of this invention, the image sensor 205 is 30×30 pixels, each pixel being 60 μm×60 μm, having a frame rate of 6500 fps, and detecting gray scale images. Image sensors with as little as 4 pixels are possible and there is no upper limit to the number of pixels the image sensor may have. Image sensors with any size pixels and a range of frames rate could also be used. Color image sensors may be used. In one embodiment the lens 215 has a focal length of 24 mm and the distance $f_1$ between the lens 215 and the image sensor 205 can be varied to focus the image of the surface 240 on the focal plane of the image sensor 205. The imaging system may have multiple lenses or may use a pinhole to form the image. One skilled in the art will have no difficulty designing an imaging system capable of producing an image of surface 240 on the image plane of image sensor 205.

A second image sensor 205' in a second integrated optical flow sensor 285', images the surface 240 along coaxial optical path 255, through beam splitter 250, along second independent optical path 257, through mirror 245 and through a second imaging lens 220. In one preferred embodiment, the second imaging lens has a focal length of 36 mm although any suitable imaging system will work that is capable of focusing an image of the surface 240 on the image plane of the image sensor 205'. In one preferred embodiment, the baseline b is 64 mm. The coaxial optical path 255 ends at the beam splitter where two different optical paths 256 and 257 emerge, one leading to the first image sensor 205 and the second leading to second image sensor 205'. The two different optical paths can vary in a multitude of ways as long as a change in the Z-distance causes different magnifications of the resulting images in sensor 205 and 205'. It is acceptable to have identical magnifications of the two systems at one Z-distance as long as it is not identical for every Z-distance. One skilled in the art will be able to design an imaging system for the two image sensors that have differing magnifications.

Image sensor 205 and image sensor 205' may have different pixel sizes and counts. In one preferred embodiment, the two image sensors have the same number of pixels and in another preferred embodiment, the number of pixels are different in relation to the difference in magnification of the two optical systems near the center of the working range of the system.

The beam splitter 250 can be any device that splits the incoming light into two optical paths. In one preferred embodiment, the beam splitter is a 50%/50% plate beam splitter.

Image sensor 205 is connected to an optical flow processor 210 and image sensor 205' is connected to an optical flow processor 210'. In one preferred embodiment, the integrated optical flow sensor 285 is an Avago ADNS 3080. One skilled in the art will appreciate the variety of available integrated optical flow sensors and wilt have no difficulty selecting a suitable one for the application.

In addition to being connected to optical flow processors 210 and 210' the images collected by image sensors 205 and 205' may be sent to an image-processor 265 which combines the Z-distance data with the 2D image data to output 3D image data.

The output of the movement of the brightness patterns from each of the optical flow processors is fed into an X, Y, Z processor 225 that converts the movement of the pair of brightness patterns into X, Y, and Z scene coordinates as well as 3D velocity vectors. The algorithm used by the X, Y, Z processor 225 is described under the operation section of this application. In one preferred embodiment the X, Y, Z processor 225 and the image processor 265 are implemented in subroutines in processor 270, but one skilled in the art can appreciate that these functions could be implemented numerous different ways including in discrete components or separate dedicated processors.

Figure 3:
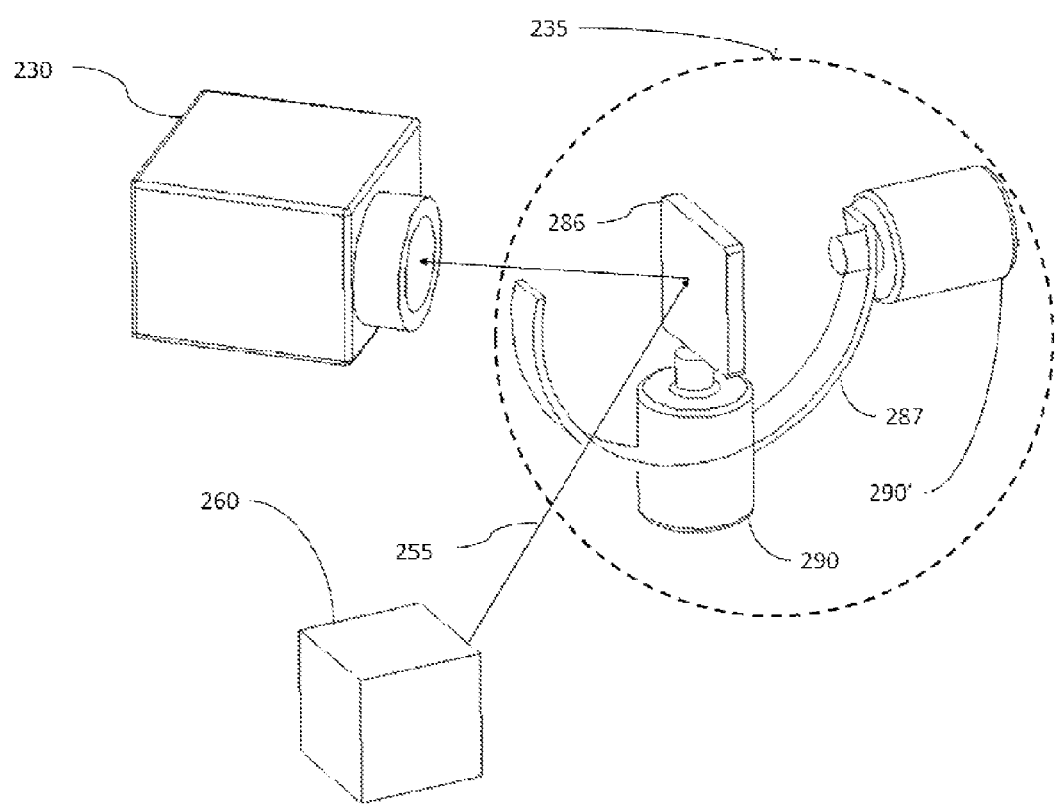
FIG. 3 is a perspective Illustration of one preferred embodiment of the 3D surface mapping system using an optical path steering device.

If the 3D surface mapping system is stationary, then the perceived movement required to produce optical flow can be induced in the scene. FIG. 3 shows a preferred embodiment of the present invention which both induces perceived motion while scanning a large number points on the surface in the scene, thus allowing the creation of dense depth maps. The system in FIG. 3 steers the coaxial optical path 255 between the stationary surface 260 and the surface mapping system 230 with an optical path steering element 286. The optical path steering element 286 is moved with optical path steering devices 290 and 290' which incorporate position encoders. Optical path steering device 290' operates through gimbaled mount 287 to allow two degrees of freedom in steering the coaxial optical path 255. In a preferred embodiment, the steering devices 290 and 290' are miniature servo motors with encoders. One skilled in the art could conceive of numerous other ways to steer the optical path 255 onto the surface including using a moving imaging component in the optical system, putting the entire system on a rotational mount or using a rotational mount around one axis for the system while scanning a second axis with a moving mirror. Such systems are well known to one skilled in the art and are commonly used in many LIDAR (Light Detection And Ranging) systems. Additionally, if the sole purpose of the steering device is to induce perceived motion, a single degree of freedom of movement suffices.

While inducing perceived motion, the system illustrated in FIG. 3 using the 2-axis scanning system creates dense depth maps of 3D surfaces in the scene. The creation of dense depth maps is described in the operation section of this application.

Figure 4:
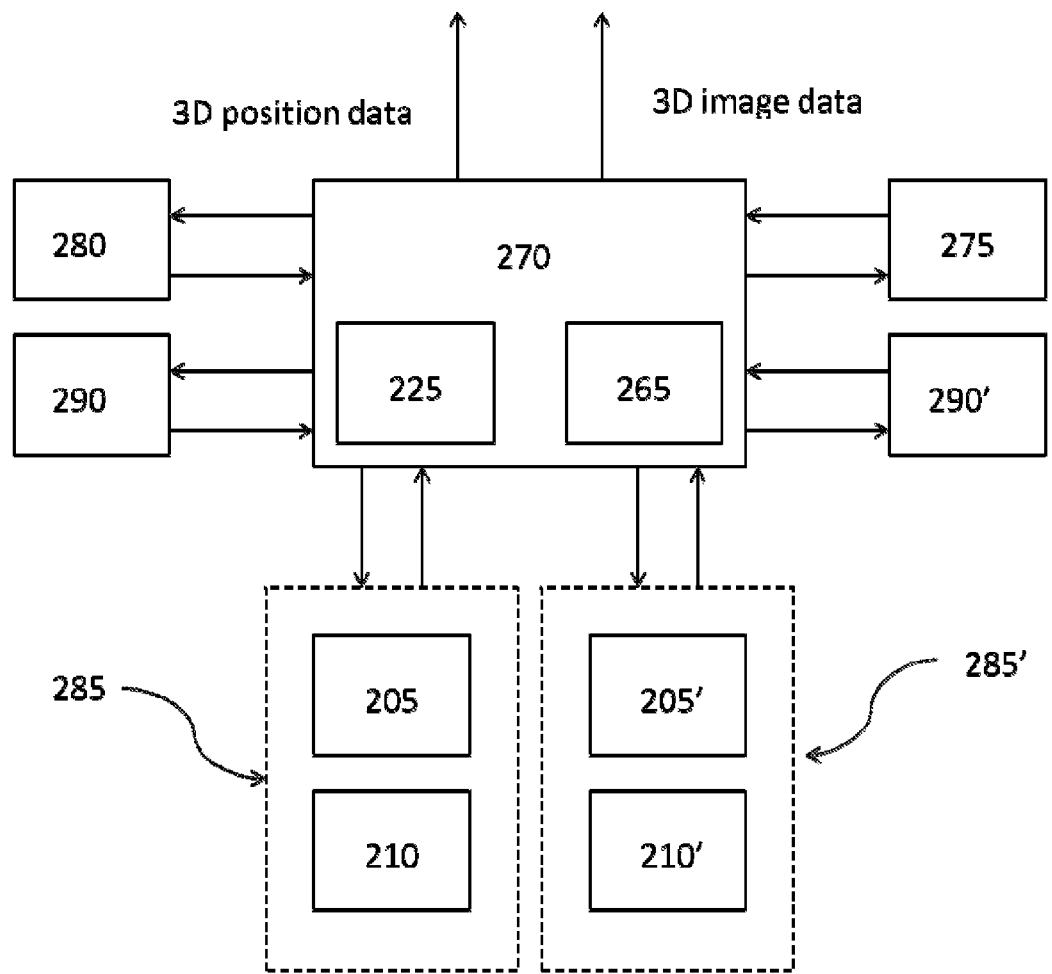
FIG. 4 is a block diagram of one preferred embodiment of the 3D surface mapping system with integrated optical flow sensors.

FIG. 4 is a block diagram of the 3D surface mapping system. The components of the system are in communication with a processor 270 which could be computer code running on a computer processor, discrete logic components, or any number of other implementations familiar to one skilled in the art. In the preferred embodiment, processor 270 is in communication with the integrated optical flow sensors 285 and 285' and can send control commands to both the image sensors 210 and 210', both the optical flow processors 205 and 205' as well as receive optical flow data and images.

In FIG. 4, processor 270 is in communication with memory 275 and input/output devices 280 which could be any combination of displays, keyboards, mice, or any other input/output device known to those skilled in the art. The processor 270 also streams 3D position data, 3D velocity data, and 3D image data.

In FIG. 4, processor 270 is also in communication with the optical path steering devices with encoders 290 and 290'. Processor 270 controls the position and velocity of the optical path steering devices 290 and 290' and reads their position from the position encoders associated with the optical path steering devices 290 and 290'.

Operation

FIG. 2-5

In FIG. 2, image sensor 205 in integrated optical flow sensor 285, takes sequential images of surface 240. In a preferred embodiment the frame rate of image sensor 205 is 6500 frames per second, but a wide range of frame rates could be used. The frame rate is dependent on the movement of the surface or surfaces in the 3D scene and the optical flow algorithm being used. Optical flow algorithms depend on some overlap between image frames. In one preferred embodiment an Avago 3080 optical flow sensor is used which has an optical flow algorithm that requires two-thirds of successive images to overlap for the algorithm to compute optical flow. One skilled in the art will be able to select appropriate frame rates and optical system magnifications to ensure that the optical flow algorithm chosen has sufficient overlap between images.

Sequential images (image n and image n+1) are taken at times t and t+Δt and the pair of images are sent to optical flow processor 210. In the preferred embodiment, the imaging system is designed such that the portion of the surface in the scene being imaged is small enough to have substantially the same optical flow across the entire image frame. Dense Z-distance maps are generated from scanning of the scene. Later in this application, under the section entitled "additional embodiments", another embodiment is illustrated which generates simultaneous dense depth maps.

Surfaces moving faster or surfaces which are closer to the imaging sensor 205 will show larger perceived velocity vectors. The relationship between the position of the surface 240 and the shift in brightness patterns follows the projection equation which is well known to one skilled in the art. The projection equation mathematically describes how a point on the 3D surface 240 in the scene maps to a pixel in the 2D image taken by image sensor 205.

At substantially the same time as image sensor 205 takes images n and n+1, image sensor 205' takes images p and p+1 of surface 240 via mirror 245 and beam splitter 250. Because of the different optical paths between the beam splitter 250 and each of the image sensors 205 and 205', the magnification of the image of surface 240 formed on the image plane of image sensor 205' varies differently with changing Z-distances relative to the magnification of the image formed on the image plane of sensor 205. Sequential images (image p and image p+1) taken at times t and t+Δt by image sensor 205' are sent to optical flow processor 210'.

The difference in magnification of each optical path results in the optical flow vectors from optical flow processor 210 being proportional to each other by the difference in magnification (and thus the difference in Z-distance) to the optical flow vectors calculated by optical flow processor 210'.

The outputs of the two optical flow processors 210 and 210' are fed into the X, Y, Z processor 225. Z-distance is computed using the projection equations for the two different magnification optical paths as follows:

Equations 1-4 are the projection equations of each of the two image sensors 205 and 205' in each of the two dimensions u and v of the image sensors. Δx and Δy is the shift of the surface in the scene relative to the image sensor 205 in the coordinates of the scene. $\Delta u_1$, $\Delta v_1$, $\Delta u_2$ and $\Delta v_2$ are the output of the optical flow processors 210 and 210' respectively and represent the shift of the brightness patterns in the image frame in pixel or subpixel coordinates between time t and t+Δt in each of the two image sensors and X, Y, and Z. b is the baseline or difference in the length of the two optical paths. $\Delta u_1$ and $\Delta v_1$ are associated with the optical flow between images n and n+1 and $\Delta u_2$ and $\Delta v_2$ are associated with the optical flow between images p and p+1.

$$\Delta u_1 = -\frac{f_1 \Delta x}{z} \qquad (1)$$

$$\Delta v_1 = -\frac{f_1 \Delta y}{z} \quad (2)$$

$$\Delta u_2 = -\frac{f_2 \Delta x}{z+b} \quad (3)$$

$$\Delta v_2 = -\frac{f_2 \Delta y}{z+b} \quad (4)$$

Solving for $\Delta x$ and $\Delta y$ gives:

$$\Delta x = -\frac{\Delta u_1 z}{f_1} \quad (5)$$

$$\Delta y = -\frac{\Delta v_1 z}{f_1} \quad (6)$$

$$\Delta x = -\frac{\Delta u_2(z+b)}{f_2} \quad (7)$$

$$\Delta y = -\frac{\Delta v_2(z+b)}{f_2} \quad (8)$$

Setting equation (5) equal to equation (7) and setting equation (6) equal to equation (8), substituting (3) and (4) for $\Delta u$ and $\Delta v$, assuming the same size pixel arrays in each of the two sensors, and solving for Z gives:

$$z = -\frac{b}{1 - r_f r_c} \quad (9)$$

where:

$$r_f = \frac{f_2}{f_1} \quad (10)$$

is the ratio of the two focal lengths of the two optical systems, and $$r_c = \frac{\Delta u_1}{\Delta u_2} = \frac{\Delta v_1}{\Delta v_2} \quad (11)$$

where $r_c$ is the ratio of the optical flow measured by the two optical flow processors.

FIG. 3 illustrates one preferred embodiment for inducing both perceived movement into the scene and creating dense depth maps. In FIG. 3, optical path steering element 286 is moved about a vertical axis by an optical path steering device 290. A second steering device 290' operates through a gimbaled mount 287 to move the optical path steering element 286 about a second axis. In the preferred embodiment, the optical path steering element 286 is a mirror and the optical path steering devices 290 and 290' are servo motors. The speed of the motors is determined by the available frame rates of the image sensors 205 and 205', the desired measurement resolution, and the required image overlap of the optical flow algorithm. The choice of speed is application dependent and can be easily determined by one skilled in the art.

The image path steering assembly 235 is placed in the coaxial optical path 255 between the 3D measurement system 230 and the surface in the scene 260 being imaged, thus inducing optical flow in an otherwise stationary scene and permitting the scanning of large areas of the scene with narrow field of view (FOV) optics and small pixel count image sensors. Using narrow FOV optics and small pixel count sensors results in images with nearly homogenous optical flow which is what allows the creation of dense depth maps while eliminating the need to find correspondences between image pairs. 2D scanning of a scene is well known to one with average skill in the art and is commonly used in LIDAR applications.

FIG. 4 shows a block diagram of a preferred embodiment of this invention. In the preferred embodiment, image sensors 205 and 205' take sequential images of the scene and transfer 2D arrays of image data to processor 270. Pairs of sequential images are sent to optical flow processors 210 and 210'. In one preferred embodiment, optical flow processors 210 and 210' and image sensors 205 and 205' are part of integrated optical flow sensors 285 and 285'. Optical flow processors 210 and 210' compute the optical flow between the pairs of sequential images and return the $\Delta u$ and $\Delta v$ values of the displacement in pixel or subpixel units of measurement for each of the two optical flow processors. Processor 270 then takes each pair of image coordinates and using an algorithm which implements equation (9) computes the Z-distance to the surface being imaged. Processor 270 then takes the Z-distance, the $\Delta u$ and $\Delta v$ values of the pixel shift from the optical flow processor 210, encoder values from the optical path steering devices 290 and 290', and calculates the 3D shift of the surface in the scene which occurred between time t and $\Delta t$.

The 3D points can then be saved in memory 275, combined with previously determined nearby points into point clouds and dense depth map and then rendered and displayed from any viewing angle as 3D surface maps on display 280, and streamed out as 3D data to other systems.

Figure 5:
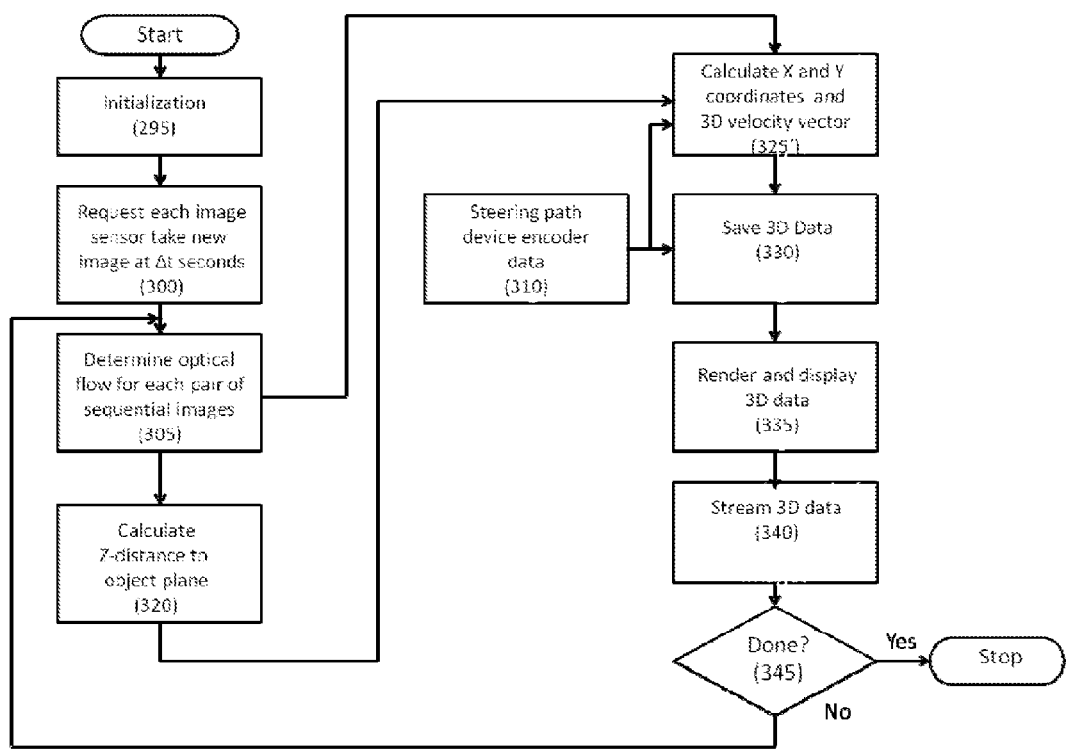
FIG. 5 is a software flow chart of the operation of one preferred embodiment of the 3D surface mapping system.

FIG. 5 shows a flow chart of the computer code implemented in the processor 270 of the block diagram of FIG. 4. In the preferred embodiment, the computer code initializes 295 all variables and peripheral devices like image sensors, displays, and input/output devices. The computer code then initiates a repeating request to the image sensors to take and transmit a new image at $\Delta t$ second intervals. When received, each successive pair of image arrays are sent to the optical flow algorithms where the optical flow 4 calculated 305. The Z-distance to the surface in the scene is determined 320.

X and Y data for each pair of images are then calculated 325 using the optical flow data 305 calculated from the first image sensor, the steering element encoder values, and the Z-distance data 320.

The 3D points and 3D velocity vectors are then saved in memory 330 along with the encoder values for the two optical path steering devices, rendered and displayed from any viewing angle 335 and streamed out as 3D data to other systems. Compiling surface maps from sets of 3D points is well known to one with average skill in the art. The software code then checks for a request to stop and if it hasn't received one computes the optical flow for the next pair of sequential images.

Additional Embodiments

FIGS. 6-8

The previous embodiment uses a series of independently acquired 3D point values of surface locations in the scene and combines those points into 3D surface maps using a optical path steering device and position information from the steering device encoders. The embodiment described below addresses applications where it is desirable to acquire simultaneous dense Z-distance maps. To obtain simultaneous dense Z-distance maps large enough areas of the scene must be imaged such that the optical flow within the image frame will most likely be heterogeneous. As such correlation between images needs to occur to identify corresponding points in the pair of images. This correlation process is the same as that of image pairs taken with a forward translating camera and as such the issues associated with finding correlations in stereo pairs (lighting and pose) are reduced.

Figure 6:
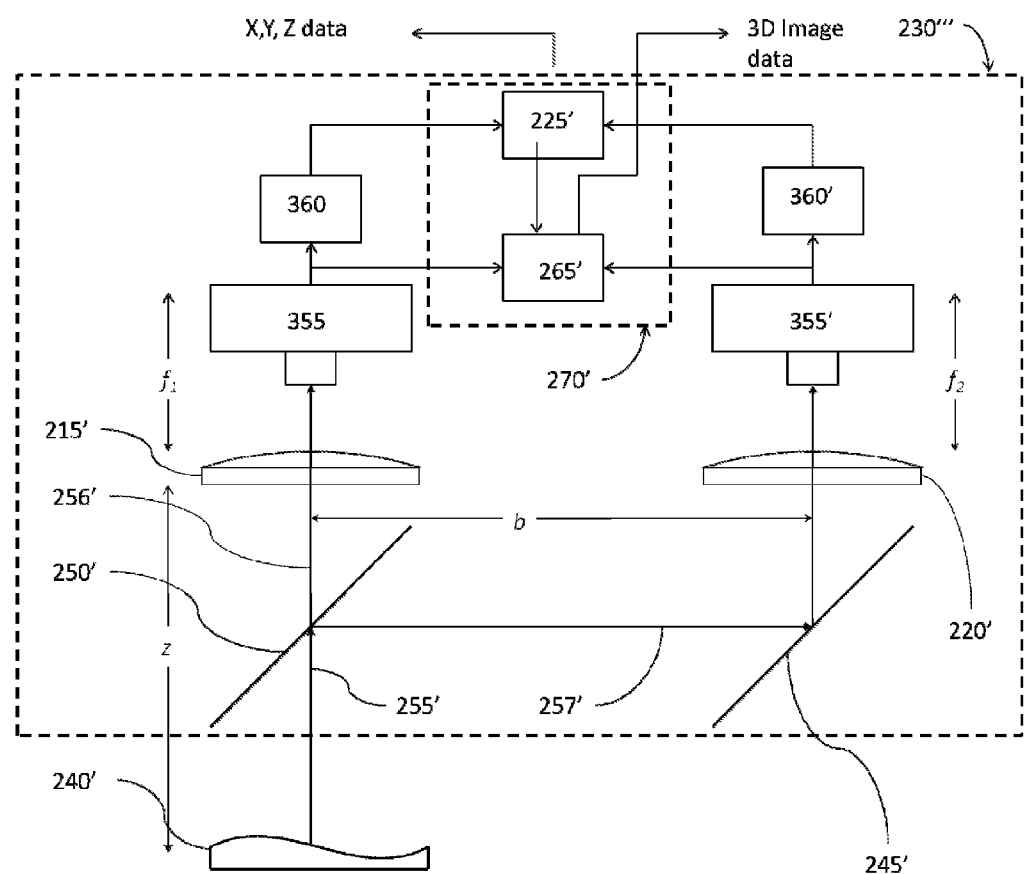
FIG. 6 is an illustration of an additional preferred embodiment of the 3D surface mapping system where the image sensors and optical flow processors are discrete components.

FIG. 6 illustrates a 3D measurement system that determines dense Z-distance maps according to the invention. A first image sensor 355 images a surface in the 3D scene 240' through beam splitter 250' and imaging lens 215' along coaxial optical path 255'. A second image sensor 355' images the surface 240' through a second imaging lens 220', a mirror 245' and the beam splitter 250'. The surface 240' being imaged may have a flat surface parallel to the image plane of image sensor 355, or it may have surface variations. Additionally, there may be several surfaces in the scene at various different distances from the image sensor 355. Furthermore, some elements of the surface may be in motion relative to other elements of the surface. The image sensors 355 and 355' may have a range of pixel counts and resolutions as well as frame rates. In one preferred embodiment of this invention, the image sensors 355 and 355' are 640×480 pixels, have a frame rate of 30 fps, and detect gray scale images. As in the previous embodiment, the lenses 215' and 220' as well as the focal lengths $f_1$ and $f_2$ are selected to provide two different magnifications. One skilled in the art will be able to design an imaging system for the two image sensors that have appropriately differing magnifications.

As in the previous embodiment, the image sensors 355 and 355' are connected to optical flow processor 360 and 360' respectively. In this embodiment, the optical flow processors are executed in software on a separate computer processor. However, image sensors 355 and 355' could be integrated with optical flow processors 360 and 360' into integrated optical flow sensors. Optical flow algorithms are well known to those in the art and are described in the paper by Horn and Schunck referenced above. One skilled in the art will appreciate that any optical flow algorithm could be used.

Figure 7:
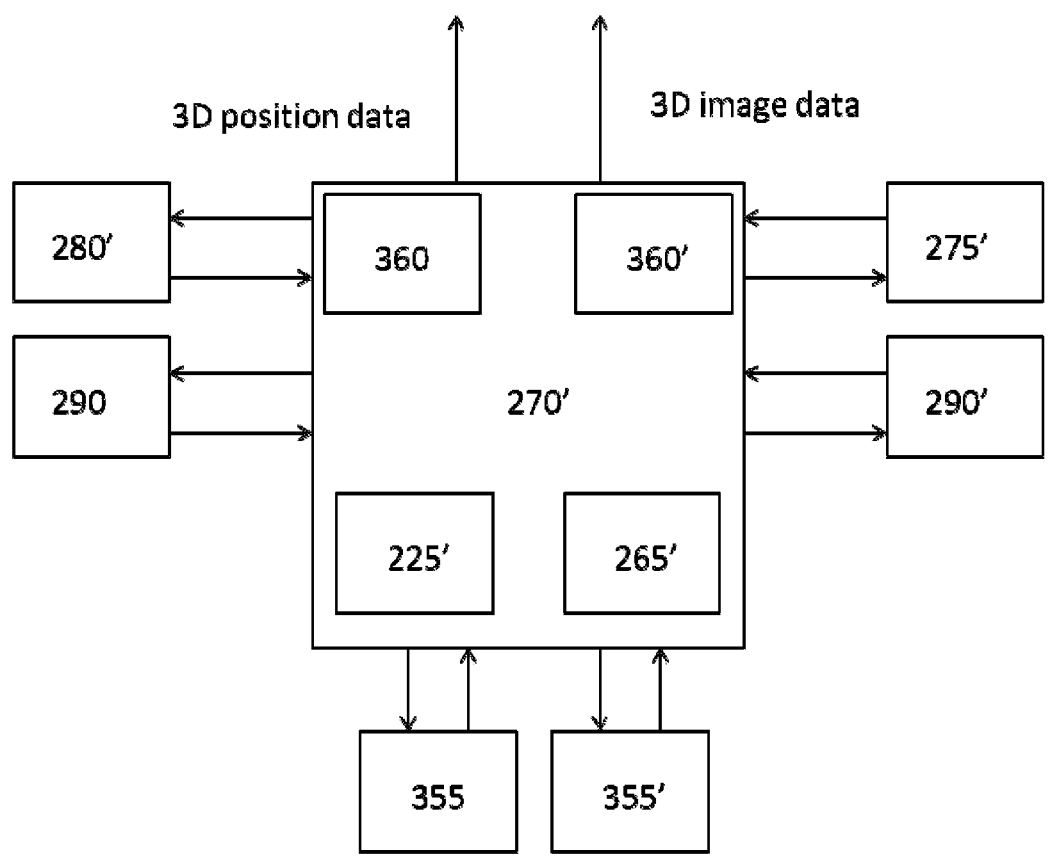
FIG. 7 is a block diagram of an additional preferred embodiment of the 3D surface mapping system where the optical flow algorithms are implemented as subroutines in the processor's software.

FIG. 7 is a block diagram of the 3D surface mapping system. The components of the system are connected to a computer processor 270' which could be computer code running on a processor, discrete logic components, or any number of other implementations familiar to those skilled in the art. In the preferred embodiment, processor 270' is connected to image sensors 355 and 355' and optical flow processors 360 and 360' are implemented in software subroutines in the processor 270'. The optical flow processors could also be distinct hardware. There may be two distinct processors or one may be shared. One skilled in the art will be able to conceive of a multitude of ways of getting optical flow data from pairs of images, including incorporating the optical flow processor in the same integrated circuit (IC) package as the image sensor.

In FIG. 7, processor 270' is in communication with memory 275' and input/output devices 280' which could be any combination of displays, keyboards, mice, or any other input/output device known to those skilled in the art. Additionally 3D position data, 31) velocity vectors, and 3D image data may be streamed out to other devices.

Figure 8:
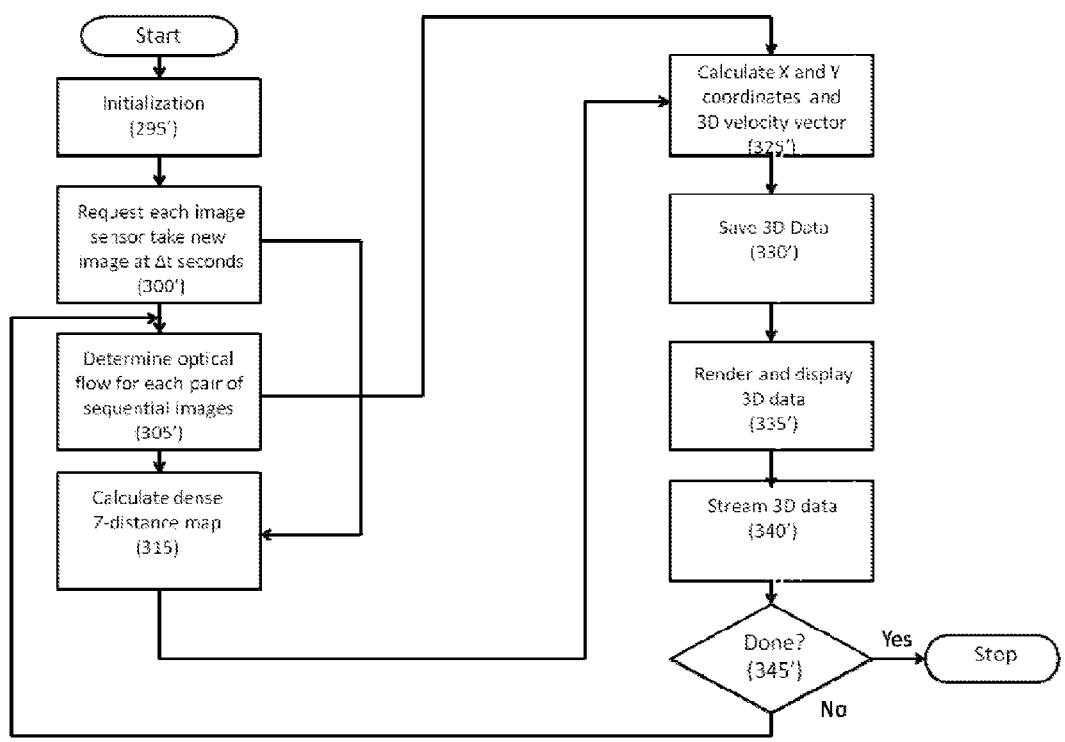
FIG. 8 is a software flow chart of the operation of an additional preferred embodiment the 3D surface mapping system where simultaneous dense depth maps are computed.

FIG. 8 shows a flow chart of the computer code implemented in the processor 270' of the block diagram of FIG. 7. In the preferred embodiment, the computer code initializes 295' all variables and peripheral devices like image sensors, displays, and input/output devices. The computer code then initiates a repeating request to the image sensors to take and transmit a new image at Δt second intervals. When received, each successive pair of image arrays are sent to the optical flow algorithms where the optical flow is calculated 305. A dense Z-distance map is computed 315 then the optical flow vectors are used to calculate X and Y using equation (9) 325'.

The 3D points can then be saved in memory 330', rendered and displayed from any viewing angle 335' and streamed out as 3D data 340' to other systems. The software code then checks for a request to stop 345' and if it hasn't received one computes the optical flow for the next pair of sequential images.

Additional Embodiments

Operation

FIGS. 6-8

To produce dense Z-distance maps, the pixels in the image pairs taken by image sensors 355 and 355' of FIG. 6 and converted to dense optical flow maps (2D arrays of optical flow vectors) by optical flow processors 360 and 360' must be correlated. This correlation process is substantially the same as for a forward translating camera and is well known in the art. It is based on the knowledge that the center pixel in image sensor 355 is imaging substantially the same location on the surface 240' as the center pixel in image sensor 355'. This allows the correlation algorithm to search along corresponding radial lines emanating from the centers of the two image sensor. This type of correlation is well known to one skilled in the art and could be done using a number of techniques known in the art such as normalized cross correlation, corner detection, or dynamic programming. Dynamic programming is currently the preferred method. Pixel values, optical flow vectors or both could be used for the correlation. In the preferred embodiment pixel values are initially used and errors are found and corrected using the optical flow vectors. The two sets of optical flow vectors being proportional to each other by the ratio of the Z-distance to the Z-distance plus the baseline b. Using both the pixel values and the optical flow vectors doubles the amount of information used in the correlation thus improving the accuracy of finding corresponding points.

One skilled in the art could conceive of numerous ways of scaling the images to find the correspondences.

Once correspondences are found, the X, Y, Z processor 225' uses equation 9 to calculate the Z-distance coordinate for each pixel or sub-pixel location that is both in the optical flow output of optical flow processor 360 and optical flow processor 360' and once the Z-distance is known X and Y are computed. The x, Y, and Z position data is output directly and combined with the image data in image processor 265' to produce 3D image data. Combining dense Z-distance maps with 2D image data is well known to one with average skill in the art.

Alternative Embodiments

Figure 9:
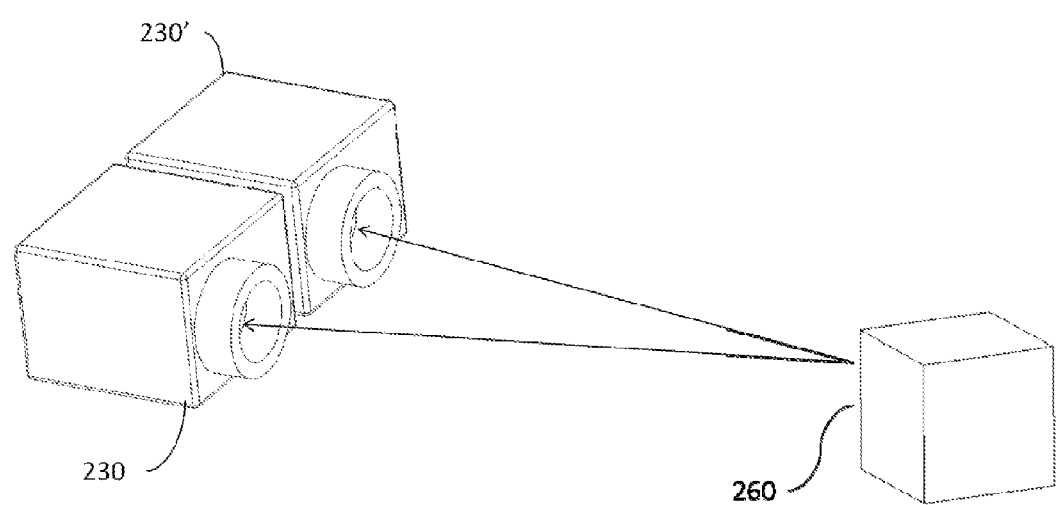
FIG. 9 is a perspective illustration of an alternative embodiment of the 3D surface mapping system for inducing motion in the scene.
Figure 11:
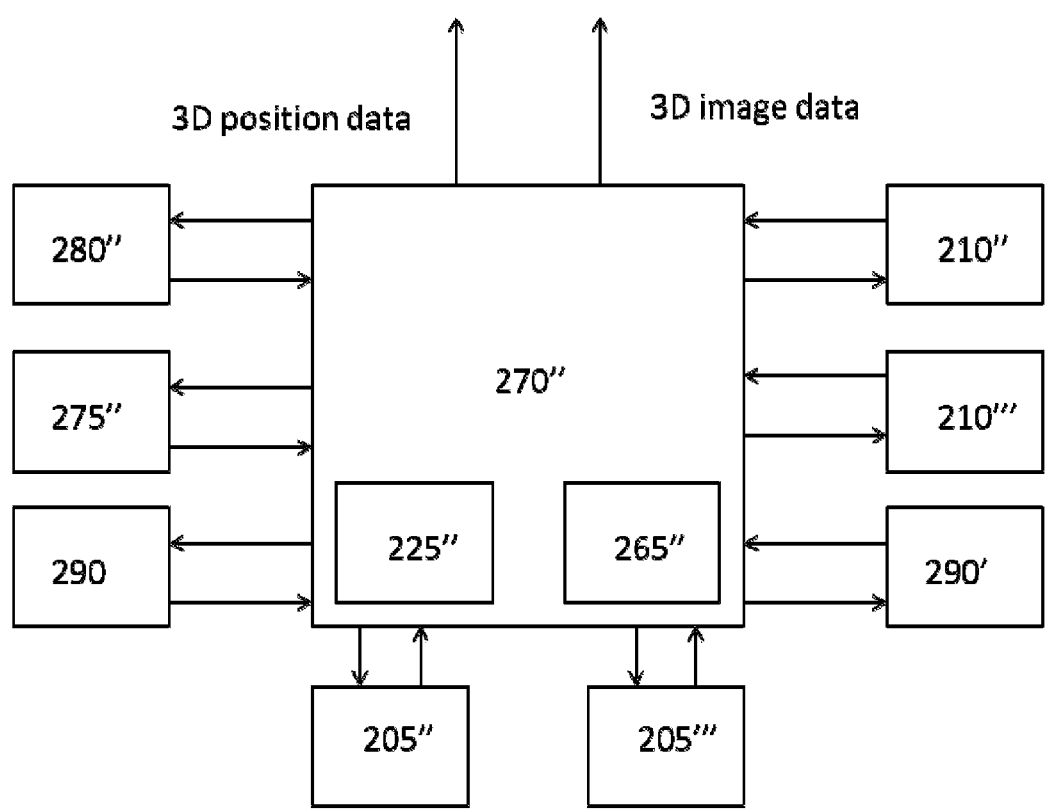
FIG. 11 is a block diagram of an alternative embodiment of the 3D surface mapping system where the optical flow processors are discrete components independent of the image sensors.

FIGS. 9 and 11

An alternative preferred embodiment is show in FIG. 9 which uses a stereo pair of surface mapping systems 230 and 230' to induce perceived motion. The system of FIG. 9 operates in the same manner as the system of FIG. 2 with the exception that images n and p are taken by the image sensors in system 230 and the images n+1 and p+1 are taken by the image sensors in system 230'. One skilled in the art can appreciate the many different ways that permit inducing perceived motion in the system.

Figure 10:
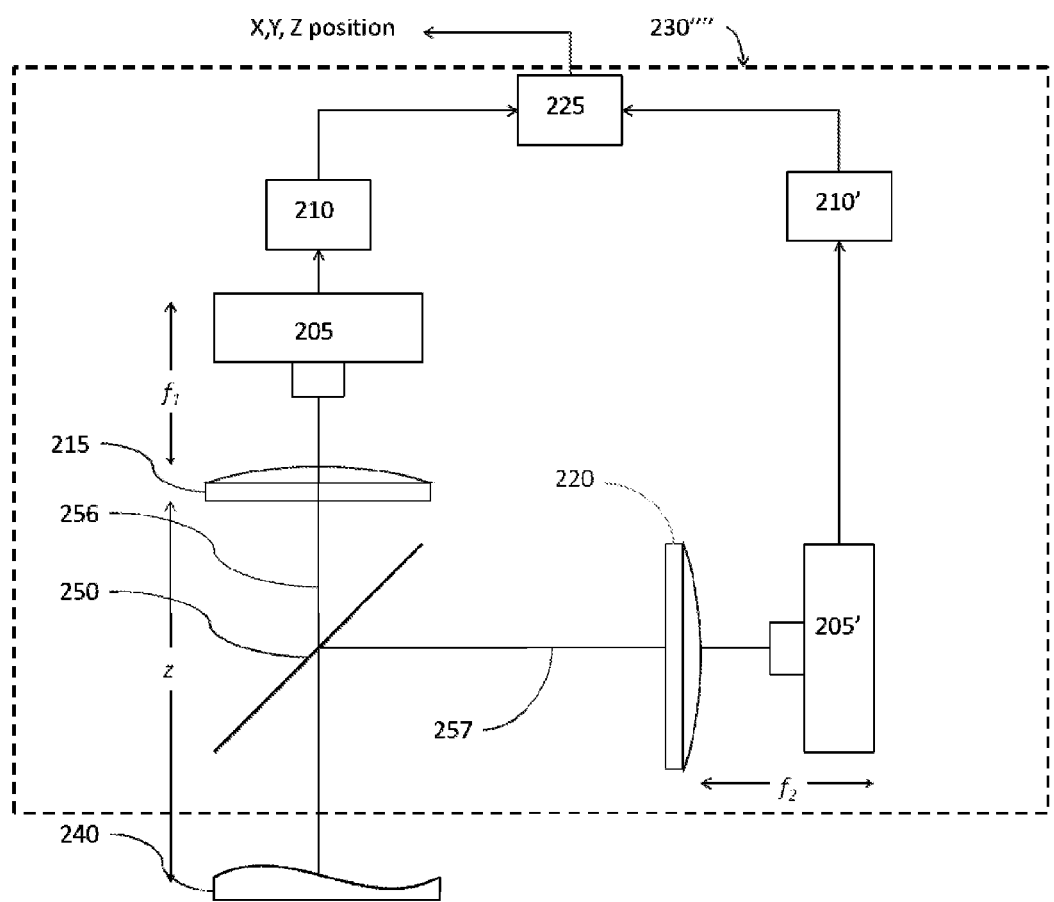
FIG. 10 is an illustration of an alternative embodiment of the 3D surface mapping system where the image planes of the two image sensors are not coplanar.

FIG. 10 is another embodiment of the present invention in which the optical path from the beam splitter 250 goes directly into the image sensor 205' without using a mirror. In this embodiment, the baseline b (not shown), is the effective difference in the length of the optical paths for the two image sensors. One skilled in the art can appreciate the many different ways that the two image sensors could be oriented and the image path modified to achieve the same results.

FIG. 11 is another embodiment of the present invention in which the optical flow processors 210" and 210''' are implemented as separate hardware components. In this embodiment the processor 270" controls the flow of images between image sensors 205" and 205''' and the separate hardware implementations of the optical flow processors 210" and 210'''.

Additionally, one with skill in the art can see how the 3D surface mapping system using optical flow of this invention could be integrated with RGB-D cameras, LIDAR, or NIR range finders to improve accuracy or increase the resolution or range in particular applications.

ADVANTAGES

From the description above, a number of advantages of the 3D surface mapping system of this invention become evident:
(1) 3D coordinates of points on surfaces in the scene can be measured without the inaccuracies associated with finding correspondences between stereo image pairs caused by changing pose and lighting conditions.
(2) 3D coordinates of points on surfaces in the scene can be measured without depending on the measurement of very short TOF durations and the associated inaccuracies and lose of resolution.
(3) 3D coordinates of points on surfaces in the scene can be measured without the noise and errors associated with spurious reflected energy.
(4) 3D coordinates of points on surfaces in the scene can be measured when the scene and the image plane of the image sensors are skewed without requiring knowledge of the skew angle.
(5) The 3D velocity vector of the 3D surface mapping system relative to the surface being imaged can be determined.
(6) The 3D velocity vector of one surface can be determined relative to another surface.

CONCLUSION, RAMIFICATIONS, AND SCOPE

Accordingly, the reader will see that the 3D surface mapping system of this invention provides accurate 3D surface mapping of 3D surfaces without requiring the finding of correspondences in stereo image pairs, is tolerant to or entirely unaffected by the noise issues associated to using TOF calculations in RGB-Depth (RGB-D) cameras, and is unaffected by skewing of the plane of the measurement system with that of the surface.

Furthermore, the surface mapping system of this invention has the additional advantages in that:
the system can provide accurate single point Z-distance values or dense Z-distance depth maps and the associated 3D surface shape.
the system can provide dense maps one point at a time or simultaneously.
the system can provide surface maps which distinguish between rigid surfaces and surfaces that consists of multiple independently moving surfaces.
the system provides velocity measurements of surface elements which are moving relative to the surface.

Although the description above contains many specificities, these should not be construed as limiting the scope of the invention but as merely providing illustrations of some of the presently preferred embodiments of this invention. It will be apparent to one skilled in the art that the invention may be embodied still otherwise without departing from the spirit and scope of the invention.

Thus the scope of the invention should be determined by the appended claims and their legal equivalents, rather than by the examples given.

I claim:

1. A 3D surface mapping method for determining the coordinates of points on surfaces, comprising the steps of:
providing a means of splitting an optical path into two optical paths;
providing a first and a second means of obtaining sequential images of said surface, said first and second means of obtaining sequential images of said surface having a substantially coaxial optical path between said surface and said means of splitting an optical path and substantially non-coaxial optical paths between said means of splitting an optical path and said first and second means of obtaining sequential images;
taking sequential images with said first and second means of obtaining sequential images;
providing a means of computing a first optical flow between said sequential images obtained by said first means of obtaining sequential images and a second optical flow between each of said sequential images in said second means of obtaining substantially sequential images;
providing a computational means for determining at least one Z-distance between said surface and said first and second means of obtaining sequential images using the ratio of said first optical flow and said second optical flow;
and computing at least one Z-distance between said surface and said first and second means of obtaining sequential images.

2. The method of claim 1, further providing a means of steering said coaxial optical path to acquire said Z-distances at a plurality of locations on said surface.

3. The method of claim 1, further providing a means of compiling said Z-distances acquired at a plurality of locations into a 3D surface map.

4. The method of claim 1, further providing a means of finding correspondences between the images formed by said first means of obtaining images and said second means of obtaining images.

5. The method of claim 1, further providing a first and a second means of computing the optical flow in communication with said first and second means of obtaining images.

6. A 3D surface mapping system for determining the coordinates of points on surfaces comprising:
a means of splitting an optical path into a plurality of optical paths;
a first and a second means of obtaining sequential images of said surface, said first and second means of obtaining sequential images of said surface having a substantially coaxial optical path between said surface and said means of splitting an optical path;

said first and second means of obtaining sequential images of said surface having substantially non-coaxial optical paths between said means of splitting an optical path and said first and second means of obtaining sequential images;

said first and second means of obtaining sequential images in communication with a means of computing a first optical flow between each of said sequential images in said first means of obtaining sequential images and a second optical flow between each of said sequential images in said second means of obtaining sequential images;

and a computational means for determining at least one Z-distance between said first and second means of obtaining sequential images and said surface from the ratio of said first optical flow and said second optical flow.

7. The 3D surface mapping system of claim 6, further comprising a means of steering said coaxial optical path to acquire said at least one Z-distance at a plurality of locations on said surface.

8. The 3D surface mapping system of claim 6, further comprising a means of compiling said at least one Z-distance acquired at a plurality of locations into a 3D surface map.

9. The 3D surface mapping system of claim 6, further comprising a means of finding correspondences between images formed by said first means of obtaining images and said second means of obtaining images.

10. The 3D surface mapping system of claim 6, wherein said first and said second means of obtaining images are in communication with a first and a second means of computing optical flow.

11. The 3D surface mapping system of claim 6, wherein said first means of obtaining images and said first means of computing optical flow are integrated.

12. The 3D surface mapping system of claim 6, further comprising a means of computing a velocity of the 3D surface mapping system relative to said surface.

13. The 3D surface mapping system of claim 6, further comprising a means of computing a velocity of said surface relative to a second surface.

14. A 3D surface mapping system for determining the coordinates of points on surfaces comprising:

a beam splitting device for splitting an optical path into two optical paths;

a first and a second image sensor for obtaining sequential images of said surface, said first and second image sensors having substantially coaxial optical paths between said surface and said beam splitting device;

said first and second image sensors having substantially non-coaxial optical paths between said beam splitting device and said first and second image sensors;

said first and second image sensors in communication with at least one optical flow processor for computing optical flow between sequential images;

and a processor for computing at least one Z-distance between said 3D mapping system and said surface using said optical flow.

15. The 3D surface mapping system of claim 14, further comprising an optical path steering device for steering the coaxial optical path to acquire said at least one Z-distance at a plurality of locations on said surface.

16. The 3D surface mapping system of claim 14, further comprising a processor for compiling said Z-distances acquired at a plurality of locations into a 3D surface map.

17. The 3D surface mapping system of claim 14, further comprising a processor for finding correspondences between images formed by said first image sensor and said second image sensor.

18. The 3D surface mapping system of claim 14, wherein said first and said image sensors are in communication with a first and a second optical flow processor.

19. The 3D surface mapping system of claim 14, wherein said first image sensor and said first optical flow processor are integrated.

20. The 3D surface mapping system of claim 14, wherein said second image sensor and said second optical flow processor are integrated.

* * * * *